(12) United States Patent
Kosuth et al.

(10) Patent No.: US 12,556,001 B2
(45) Date of Patent: Feb. 17, 2026

(54) SYSTEM AND METHOD FOR CONTROLLING A PLURALITY OF POWER GENERATORS

(71) Applicant: General Electric Renovables Espana, S.L., Barcelona (ES)

(72) Inventors: Charles Joseph Kosuth, Asheville, NC (US); Patrick Hammel Hart, Ballston Lake, NY (US); Enno Ubben, Steinfurt (DE)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 616 days.

(21) Appl. No.: 17/738,347

(22) Filed: May 6, 2022

(65) Prior Publication Data

US 2023/0361569 A1 Nov. 9, 2023

(51) Int. Cl.
*H02J 3/16* (2006.01)
(52) U.S. Cl.
CPC ............. *H02J 3/16* (2013.01); *H02J 2300/28* (2020.01); *H02J 2300/40* (2020.01)
(58) Field of Classification Search
CPC ...... H02J 3/16; H02J 2300/28; H02J 2300/40; H02J 3/466; H02J 3/48; H02J 3/381; Y02E 10/72
See application file for complete search history.

(56) References Cited

U.S. PATENT DOCUMENTS 9,026,258 B2  5/2015  Stapelfeldt
9,407,186 B2  8/2016  Babazadeh et al.
(Continued)

FOREIGN PATENT DOCUMENTS

EP  2326835 B1  1/2011
EP  2921698 A1  9/2015
(Continued)

OTHER PUBLICATIONS

M. Singh, V. Gevorgian, E. Muljadi and E. Ela, "Variable-speed wind power plant operating with reserve power capability," 2013 IEEE Energy Conversion Congress and Exposition, Denver, CO, USA, 2013, pp. 3305-3310, doi: 10.1109/ECCE.2013.6647134. (Year: 2013).*

(Continued)

*Primary Examiner* — Thomas C Lee
*Assistant Examiner* — Tyler Dean Hedrick
(74) *Attorney, Agent, or Firm* — Dority & Manning, P.A.

(57) ABSTRACT

Systems connected to an electrical grid for delivering electrical power thereto and methods of controlling such systems are provided. The electrical system includes a plurality of power generators. A system-level controller receives a demand signal from the electrical grid. The system-level controller generates first and second power production commands for respective first and second power generators. The first power production command is based on an excluded zone of operation for the first power generator. The first and second power production commands are transmitted to the plurality of power generators so as to control a power output of the first power generator according to the first power production command and to control a power output of the second power generator according to the second power production command. The power output of the first power generator is outside of the excluded zone of operation for the first power generator.

16 Claims, 5 Drawing Sheets

(56) References Cited

U.S. PATENT DOCUMENTS

| | | | |
|---|---|---|---|
| 9,556,852 B2 | 1/2017 | Babazadeh et al. | |
| 9,709,037 B2 | 7/2017 | Sagi et al. | |
| 10,027,118 B2 | 7/2018 | Ubben et al. | |
| 10,116,135 B1* | 10/2018 | Shapiro | H02J 3/12 |
| 10,539,118 B2 | 1/2020 | Jessen et al. | |
| 10,570,882 B2 | 2/2020 | Hardwicke, Jr. et al. | |
| 10,989,169 B1 | 4/2021 | Kosuth et al. | |
| 2010/0025994 A1 | 2/2010 | Cardinal et al. | |
| 2015/0267683 A1 | 9/2015 | Ubben et al. | |
| 2016/0049792 A1 | 2/2016 | Burra et al. | |
| 2016/0064934 A1* | 3/2016 | Zhao | H02J 3/38 700/287 |
| 2017/0279281 A1* | 9/2017 | Hamm | F02G 1/045 |
| 2018/0245568 A1* | 8/2018 | Pedersen | F03D 7/0244 |
| 2018/0355848 A1 | 12/2018 | Wei et al. | |
| 2019/0003456 A1 | 1/2019 | Garacia et al. | |
| 2019/0162166 A1 | 5/2019 | Jessen et al. | |
| 2019/0207391 A1* | 7/2019 | Fazeli | H02M 7/48 |
| 2020/0140106 A1* | 5/2020 | Dougherty | H02P 29/40 |
| 2020/0200145 A1 | 6/2020 | Zinck et al. | |
| 2023/0141934 A1 | 5/2023 | Rotbert et al. | |
| 2023/0163682 A1* | 5/2023 | Shah | H02M 3/285 363/13 |

FOREIGN PATENT DOCUMENTS

| | | |
|---|---|---|
| EP | 3484008 A1 | 5/2019 |
| WO | WO2017118460 A1 | 7/2017 |
| WO | WO2018/076236 A1 | 5/2018 |
| WO | WO202/1177947 A1 | 9/2021 |

OTHER PUBLICATIONS

European Search Report Corresponding to EP23170795 on Oct. 20, 2023.

* cited by examiner

SYSTEM AND METHOD FOR CONTROLLING A PLURALITY OF POWER GENERATORS

FIELD

The present disclosure relates in general to electrical systems, such as wind farms or hybrid systems, and more particularly to systems and methods for controlling electrical systems having a plurality of power generators, wherein at least one of the power generators is operated within a constrained range, such as outside of one or more excluded zones of operation.

BACKGROUND

Electrical systems, such as groups of connected power generating assets which are coupled to an electrical grid, are typically operable to deliver power to the grid at a certain rate based on the capability of the power generating assets and other external conditions. For example, a group of wind turbines may be connected to the grid and may deliver power to the grid based on wind conditions. In some cases, the demand for power to the electrical grid may be less than the possible power which can be produced by the electrical system, e.g., collectively by the group of connected power generating assets. In such cases, one or more of the power generating assets may be curtailed, e.g., may be operated at a reduced level.

When one or more of the power generating assets in an electrical system is operated at such a reduced level, the electrical system may operate inefficiently and/or may be shutdown unnecessarily. In such instances, when the curtailment is released and the power generating assets return to operating at their full capacity, it will take longer for an offline power generating asset to ramp up and come back online than it will take an online curtailed (e.g., operating at a level greater than zero but less than full possible capacity) power generating asset to raise the level of active power produced thereby.

Thus, the art is continuously seeking new and improved systems to control a plurality of power generators and, in particular, systems and methods which provide variable levels of power generation, such as curtailment and subsequent ramp-up when the curtailment is released, with increased responsiveness to changes in power demand and increased efficiency at the various levels of operation of the power generating assets.

BRIEF DESCRIPTION

Aspects and advantages of the invention will be set forth in part in the following description, or may be obvious from the description, or may be learned through practice of the invention.

In one aspect, the present disclosure is directed to a method for controlling an electrical system connected to an electrical grid. The electrical system includes a plurality of power generators. The method includes receiving, with a system-level controller of the electrical system, a demand signal from the electrical grid. The method also includes generating, with the system-level controller, a first power production command for a first power generator of the plurality of power generators based on an excluded zone of operation for the first power generator and generating, with the system-level controller, a second power production command for a second power generator of the plurality of power generators. The method further includes transmitting the first power production command and the second power production command to the first and second power generators, respectively, so as to control a power output of the first power generator according to the first power production command and to control a power output of the second power generator according to the second power production command. As a result, the power output of the first power generator is outside of the excluded zone of operation for the first power generator.

In another aspect, the present disclosure is directed to a system for providing electrical power to an electrical grid. The system includes a plurality of power generators operatively coupled to the electrical grid and a system-level controller communicatively coupled to the plurality of power generators and to the electrical grid. The system-level controller includes at least one processor configured to perform a plurality of operations. The plurality of operations includes receiving, with the system-level controller, a demand signal from the electrical grid. The plurality of operations also includes generating, with the system-level controller, a first power production command for a first power generator of the plurality of power generators based on an excluded zone of operation for the first power generator and generating, with the system-level controller, a second power production command for a second power generator of the plurality of power generators. The plurality of operations further includes transmitting the first power production command and the second power production command to the first and second power generators, respectively, so as to control a power output of the first power generator according to the first power production command and to control a power output of the second power generator according to the second power production command. As a result, the power output of the first power generator is outside of the excluded zone of operation for the first power generator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
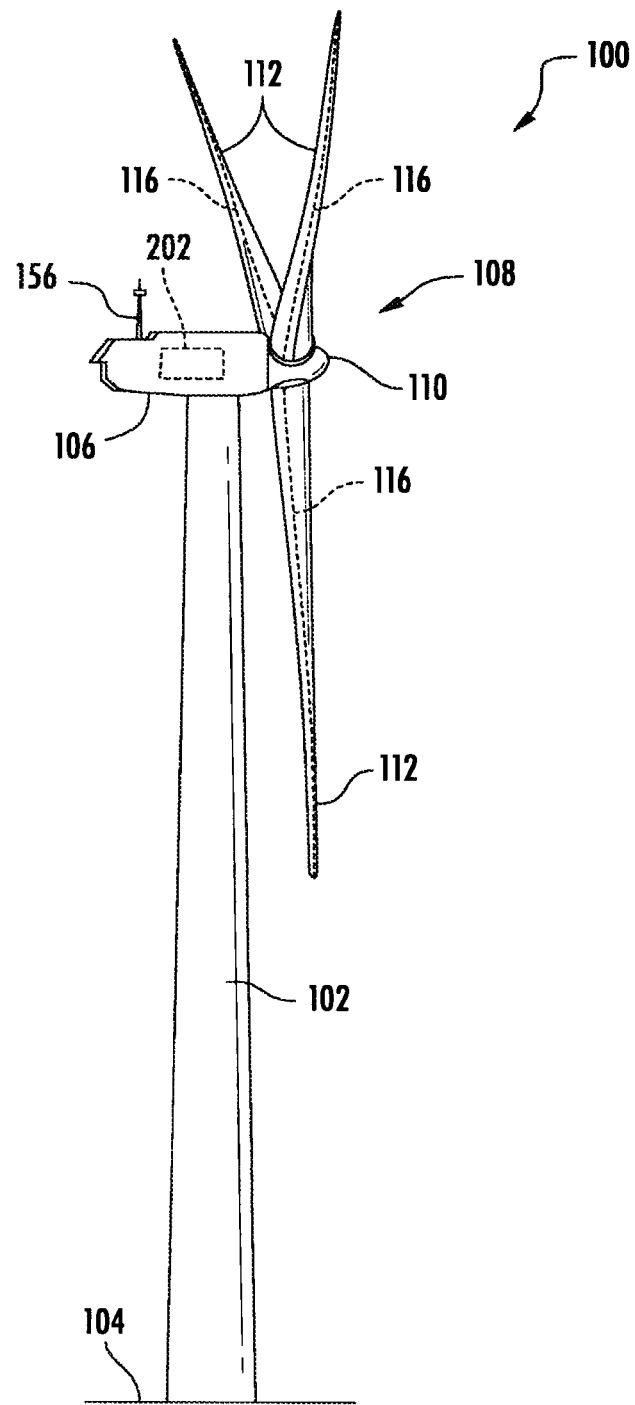
FIG. 1 illustrates a perspective view of a wind turbine, which is an embodiment of a power generator according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a plurality of power generators connected to an electrical grid. In particular, the present disclosure may include a system and method that facilitates tailoring the power production of the various power generators of the electrical system in order to provide efficient production, e.g., during a curtailment, and responsive production, e.g., expedited ramp up, when the demanded power changes, such as when returning to full capacity after the curtailment. Specifically, the present disclosure may include receiving a demand signal from the electrical grid with a system-level controller. The system-level controller may then generate power production commands for one or more power generators of the plurality of power generators. At least one of the power production commands may be based on an excluded zone of operation for the first power generator. The system-level controller may transmit the generated power production commands to the plurality of power generators so as to control a power output of one or more of the power generators, such as each of the power generators. The resultant power output of at least one of the power generators in response to the respective power production command may be outside of the excluded zone of operation, e.g., the power generator may operate at a level outside of the excluded zone of operation to deliver the commanded power production output. In other words, the system-level controller may determine the power production command based on the excluded zone of operation such that the power generator is commanded to produce a power output which does not require or cause the power generator to operate within the excluded zone of operation. For example, the excluded zone or zones may include operating levels which are inefficient and/or result in lagging response times to changed demand signals from the electrical grid. Also, the collective power output of the power generators meets the demand of the electrical grid, while operating outside of the excluded zone or zones of operation. Therefore, the systems and methods of the present disclosure may increase the efficiency and/or responsiveness of the electrical system, e.g., by avoiding such zones.

Figure 2:
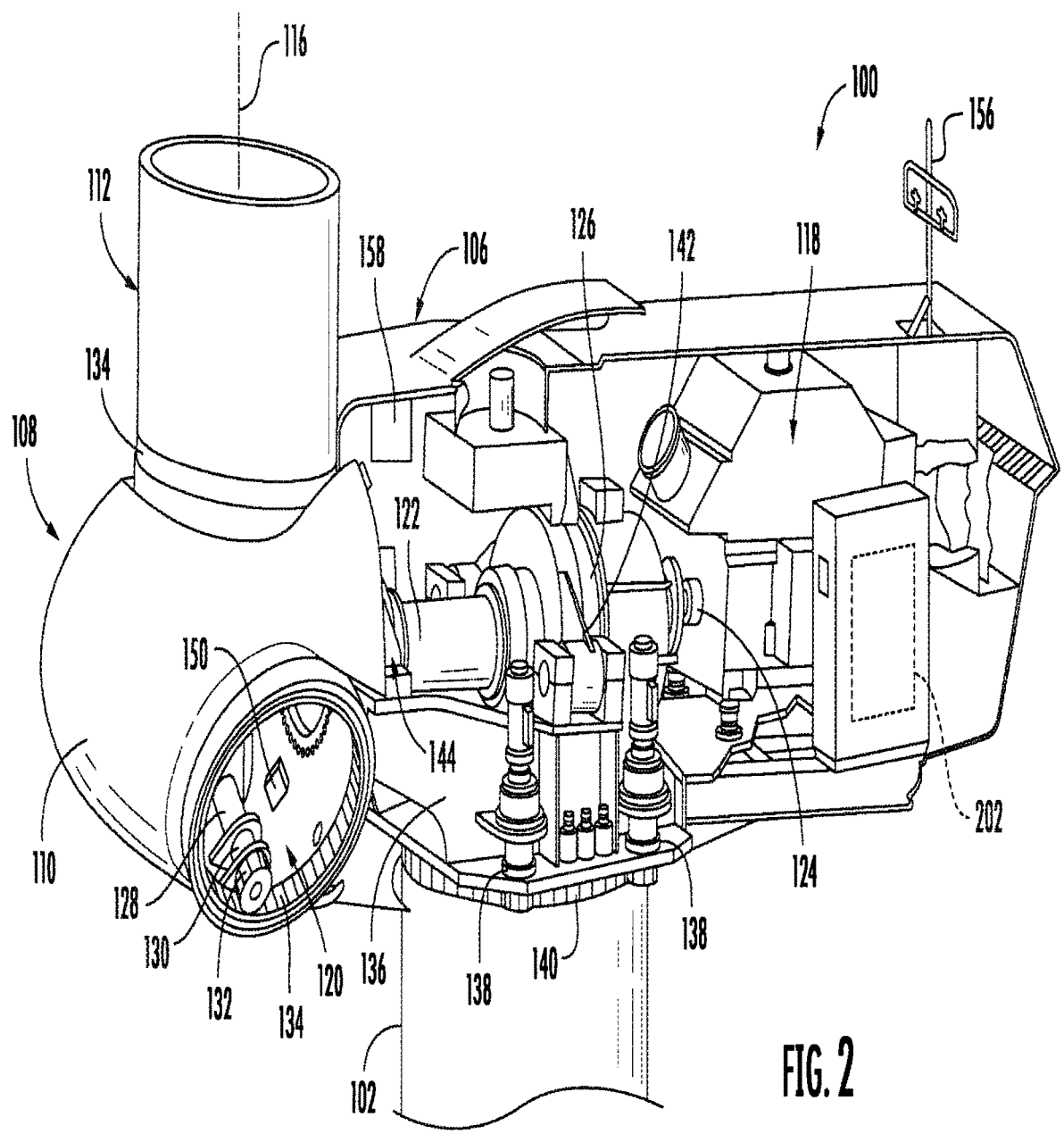
FIG. 2 illustrates a perspective, internal view of one embodiment of a nacelle of a wind turbine, which may be the wind turbine of FIG. 1, according to the present disclosure.
Figure 3:
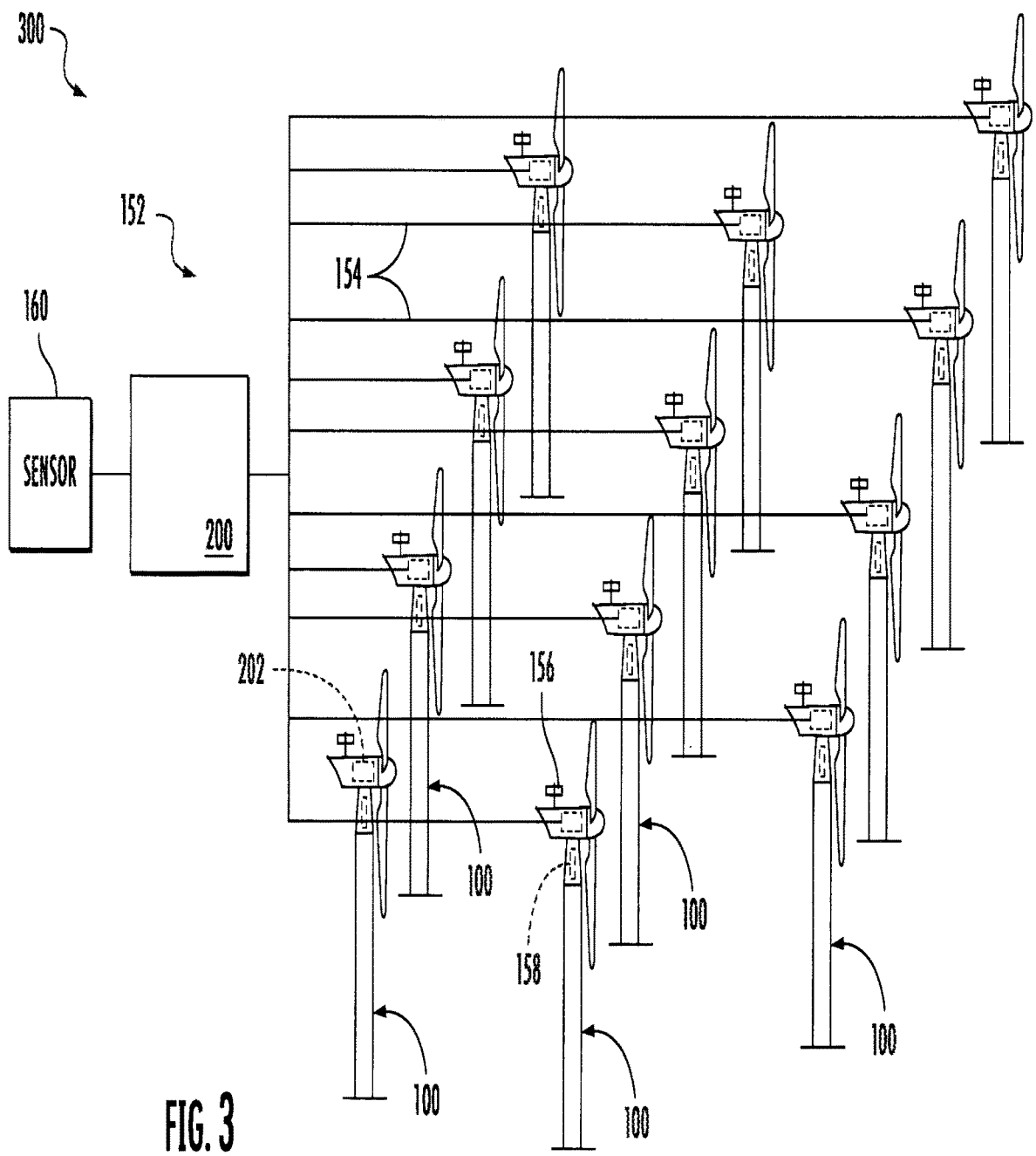
FIG. 3 illustrates a schematic diagram of one embodiment of a wind farm having a plurality of wind turbines according to the present disclosure.

Referring now to the drawings, FIGS. 1 and 2 depict an embodiment of a power generating asset or power generator, wherein the power generator is a wind turbine. In various embodiments, a plurality of power generators may be provided, such as in operative communication with each other as part of an electrical system, which also includes a system-level controller. For example, FIG. 3 depicts an electrical system connected to an electrical grid, where the electrical system includes a plurality of power generators In particular, as shown, the electrical system may be a wind farm and the plurality of power generators may include wind turbines.

In other embodiments, the electrical system may be a hybrid system, such as one or more of the power generators may be wind turbines in combination with one or more other, distinct power generators, e.g., solar, geothermal, fuel cells, etc. In additional embodiments, the electrical system may not include any wind turbines, e.g., the electrical system may be a hybrid system with various power generators other than wind turbines, and/or may be a homogenous system including only a single type of power generators, where the single type of power generators may be any suitable power generators, e.g., a system of all solar panels, an entirely geothermal system, a bank of fuel cells, etc., among numerous possible power generators and electrical systems including a plurality thereof. Thus, the terms "power generator" and "power generators" are used herein to include not only assets which generate power, e.g., wind turbines, but also assets which perform other functions in addition to power generation, such as fuel cells or batteries which are capable of both power generation and power consumption.

Referring particularly to FIG. 1, a perspective view of one embodiment of a wind turbine 100 is illustrated. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a turbine controller 202 centralized within the nacelle 106. However, in other embodiments, the turbine controller 202 may be located within any other component of the wind turbine 100 or at a location outside the wind turbine. Further, the turbine controller 202 may be communicatively coupled to any number of the components of the wind turbine 100 in order to control the components. As such, the turbine controller 202 may include a computer or other suitable processing unit. Thus, in several embodiments, the turbine controller 202 may include suitable computer-readable instructions that, when implemented, configure the turbine controller 202 to perform various different functions, such as receiving, transmitting and/or executing wind turbine control signals.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

Each rotor blade 112 may also include a pitch control mechanism 120 configured to rotate each rotor blade 112 about its pitch axis 116. The pitch control mechanism 120 may include a pitch controller 150 configured to receive at least one pitch setpoint command from the turbine controller 202. Further, each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the turbine controller 202, with each yaw drive mechanism(s) 138 being configured to change the angle of the nacelle 106 relative to the wind (e.g., by engaging a yaw bearing 140 of the wind turbine 100).

The rotation of each rotor blade 112 about its pitch axis 116 by its respective pitch control mechanism 120 may establish a pitch angle for each of the rotor blades 112. In an embodiment, the pitch angle may be an angular deviation from a zero-pitch location.

Still referring to FIG. 2, one or more sensors 156, 158 may be provided on the wind turbine 100 to monitor the performance of the wind turbine 100 and/or environmental conditions affecting the wind turbine 100. It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the turbine controller 202 to determine the condition of the wind turbine 100.

Referring now to FIG. 3, a schematic view of a wind farm 152 controlled according to the system and method of the present disclosure is illustrated. As shown, the wind from 152 may include a plurality of the wind turbines 100 described herein and a system-level controller, e.g., farm-level, controller 200. For example, as shown in the illustrated embodiment, the wind farm 152 may include twelve wind turbines 100. However, in other embodiments, the wind farm 152 may include any other number of wind turbines 100, such as less than twelve wind turbines 100 or greater than twelve wind turbines 100. In still further embodiments, the electrical system may be a hybrid system including other distinct power generators in addition to or instead of the wind turbines, as discussed above. Each power generator, e.g., each wind turbine in the example embodiment illustrated in FIG. 3, includes a unit-specific controller, such as a generator controller 202 (FIG. 4), which is a turbine controller 202 in the embodiment of FIG. 3.

In one embodiment, the turbine controller(s) 202 of the turbine(s) 100 may be communicatively coupled to the farm-level controller 200 through a wired connection, such as by connecting the turbine controller(s) 202 through suitable communicative links 154 (e.g., a suitable cable). Alternatively, the turbine controller(s) 202 may be communicatively coupled to the farm-level controller 200 through a wireless connection, such as by using any suitable wireless communications protocol known in the art. In addition, the farm-level controller 200 may be generally configured similar to the turbine controller 202 for each of the individual wind turbines 100 within the wind farm 152.

In several embodiments, the wind turbines 100 may include a plurality of sensors for monitoring various operational data of the wind turbine(s) 100 and/or one or more parameters of the wind farm 152. For example, as shown, each of the wind turbines 100 includes an environmental sensor 156 configured for gathering data indicative of at least one environmental condition. The environmental sensor 156 may be operably coupled to the farm-level controller 200 and to the turbine controller 202. Thus, in an embodiment, the environmental sensor(s) 156 may, for example, be a wind vane, an anemometer, a lidar sensor, thermometer, barometer, or other suitable sensor. The data gathered by the environmental sensor(s) 156 may include measures of wind speed, wind direction, wind shear, wind gust, wind veer, atmospheric pressure, and/or temperature. In at least one embodiment, the environmental sensor(s) 156 may be mounted to the nacelle 106 at a location downwind of the rotor 108. The environmental sensor(s) 156 may, in alternative embodiments, be coupled to, or integrated with, the rotor 108. It should be appreciated that the environmental sensor(s) 156 may include a network of sensors and may be positioned away from the turbine(s) 100. It should be appreciated that environmental conditions may vary significantly across a wind farm 152. Thus, the environmental sensor(s) 156 may allow for the local environmental conditions, such as local wind speed, at each wind turbine 100 to be monitored individually by the respective turbine controllers 202 and collectively by the farm-level controller 200.

Referring still to FIG. 3, in an embodiment, the system-level controller, e.g., farm-level controller 200, may also be operably coupled to at least one grid sensor 160. The grid sensor(s) 160 may be operably coupled to an electrical power grid. The grid sensor(s) 160 may be configured to detect data indicative of a transient grid condition. The data indicative of the transient grid condition may be interpreted by the farm-level controller 200 as a demand signal from the electrical grid.

In addition to the environmental sensor(s) 156, the wind turbine 100 may also include one or more turbine condition sensors 158. The turbine condition sensor 158 may, for example, be configured to monitor electrical properties of the output of the generator 118 of the wind turbine(s) 100, such as current sensors, voltage sensors temperature sensors, or power sensors that monitor power output directly based on current and voltage measurements.

In at least one embodiment, the turbine condition sensor(s) 158 may include any other sensors that may be utilized to monitor the operating state of the wind turbine(s) 100. More specifically, the turbine condition sensor(s) 158 may be a rotational speed sensor operably coupled to the turbine controller(s) 202. The turbine condition sensor(s) 158 may be directed at the rotor shaft 122 of the wind turbine 100. The turbine condition sensor(s) 158 may gather data indicative of the rotational speed of the rotor shaft 122, and thus the rotor 108. The turbine condition sensor(s) 158 may, in an embodiment, be an analog tachometer, a D.C. tachometer, an A.C. tachometer, a digital tachometer, a contact tachometer a non-contact tachometer, or a time and frequency tachometer.

In an additional embodiment, the turbine condition sensor(s) 158 may be a pitch sensor. As such, the turbine controller(s) 202 may receive a pitch setpoint indication for the rotor 108 of the wind turbine 100 via turbine condition sensor(s) 158 operably coupled to the pitch control mechanism 120. The turbine controller(s) 202 may consider the pitch setpoint indication in light of the environmental condition so as to determine whether the pitch of the rotor 108 is an operating state which may be changed to satisfy a required power production. It should also be further appreciated that the wind turbines 100 in the wind farm 152 may include any other suitable sensor known in the art for measuring and/or monitoring when parameters and/or wind turbine operational data.

Figure 4:
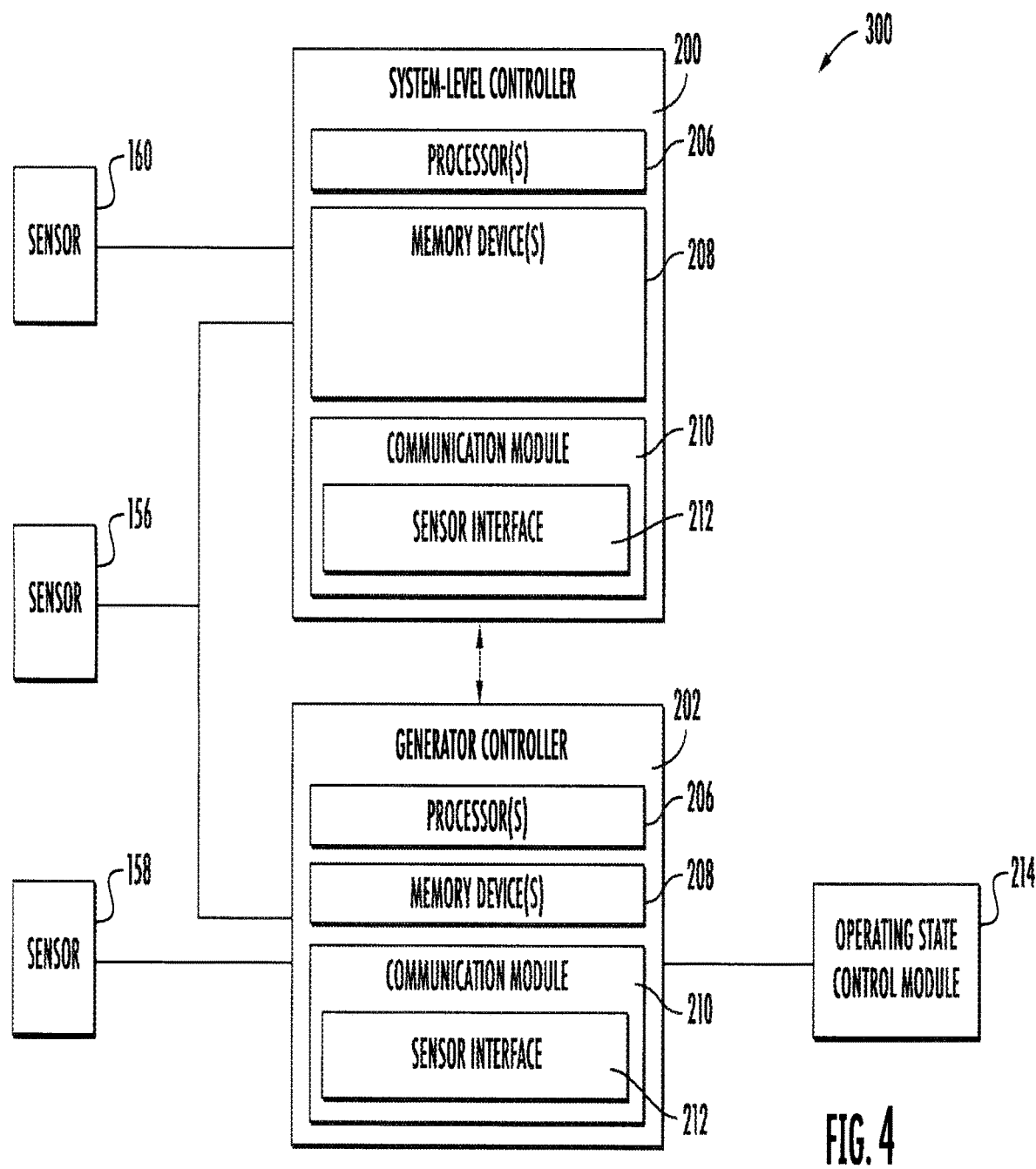
FIG. 4 illustrates a schematic diagram of one embodiment of a system controller and a power generator controller for use with the wind farm in FIG. 3.

Referring now to FIG. 4, a schematic diagram of a system 300 for controlling the electrical system, e.g., wind farm 152, according to the present disclosure is presented. For example, as shown, the controllers 200, 202 may include one or more processor(s) 206 and associated memory device(s) 208 configured to perform a variety of computer-implemented functions (e.g., performing the methods, steps, calculations and the like and storing relevant data as disclosed herein). Additionally, the controllers 200, 202 may also include a communications module 210 to facilitate communications between the controllers 200, 202 and the various components of the power generator(s) 100. Further, the communications module 210 may include a sensor interface 212 (e.g., one or more analog-to-digital converters) to permit signals transmitted from one or more sensors 156, 158, 160 to be converted into signals that can be understood and processed by the processors 206. It should be appreciated that the sensors 156, 158, 160 may be communicatively coupled to the communications module 210 using any suitable means. For example, as shown in FIG. 4, the sensors 156, 158, 160 are coupled to the sensor interface 212 via a wired connection. However, in other embodiments, the sensors 156, 158, 160 may be coupled to the sensor interface 212 via a wireless connection, such as by using any suitable wireless communications protocol known in the art. Additionally, the communications module 210 may also be operably coupled to an operating state control module 214 configured to change at least one power generator operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 202 to perform various functions including, but not limited to, exemplary methods and some or all exemplary steps thereof as described herein, as well as various other suitable computer-implemented functions.

Figure 5:
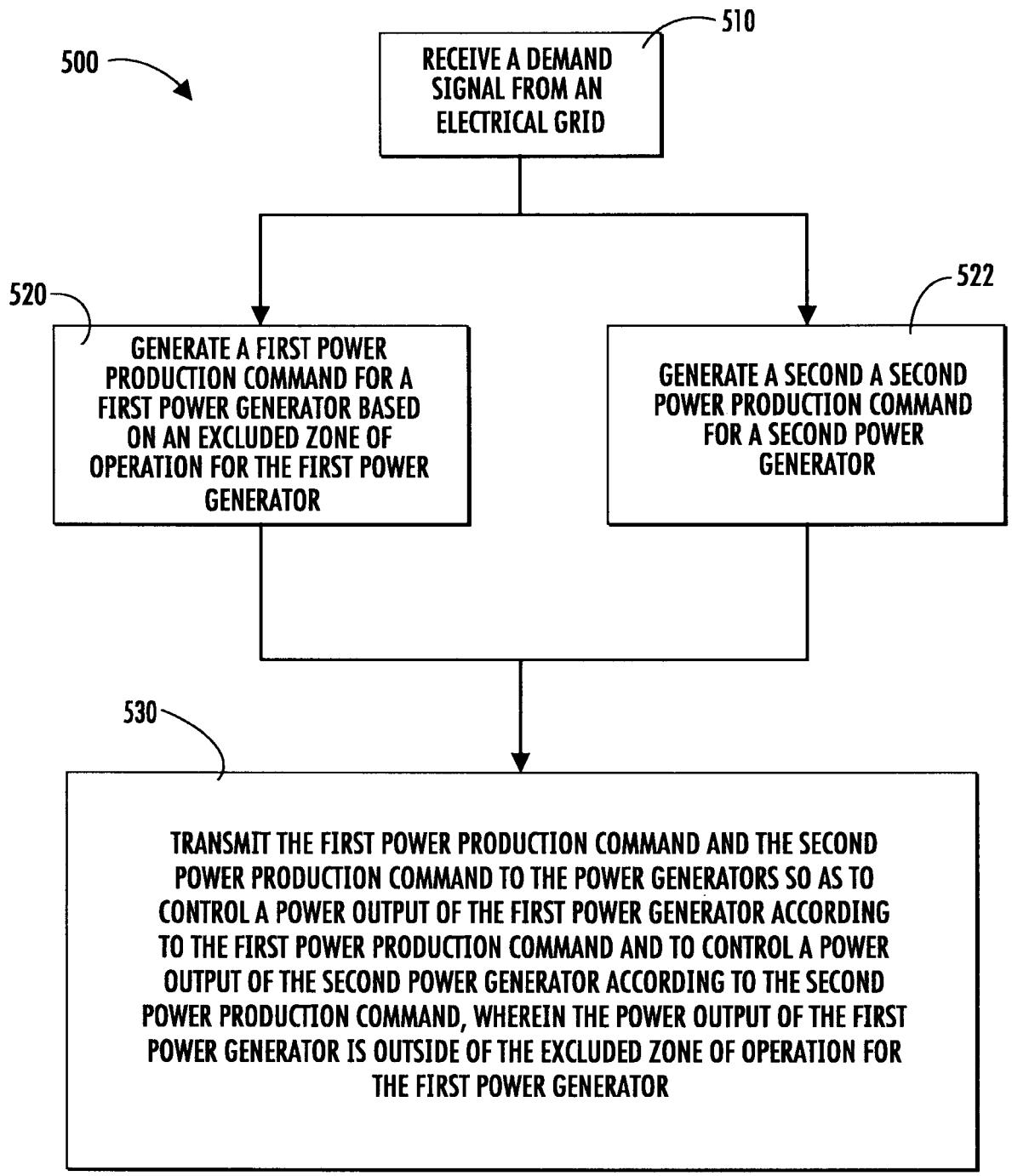
FIG. 5 illustrates a flow diagram of one embodiment of a method for controlling a plurality of power generators connected to an electrical grid according to the present disclosure.

Referring now to FIG. 5, a flow diagram of one embodiment of a method 500 for controlling an electrical system according to the present disclosure is illustrated. The method 500 may be implemented using, for instance, the system 300 of the present disclosure discussed above with references to FIGS. 1-4. FIG. 5 depicts steps performed in a particular order for purposes of illustration and discussion. Those of ordinary skill in the art, using the disclosures provided herein, will understand that various steps of the method 500, or any of the methods disclosed herein, may be adapted, modified, rearranged, performed simultaneously, or modified in various ways without deviating from the scope of the present disclosure.

As shown at (510), the method 500 may include receiving, with a system-level controller of the electrical system, a demand signal from the electrical grid. In some embodiments, the demand signal may be one of multiple demand signals which vary over time, such as increasing or decreasing demand for power to the electrical grid. In additional embodiments, the demand signal from the electrical grid may be less than an aggregate possible power production of the plurality of power generators. For example, in an embodiment, the level of electrical power called for by the demand signal may be less than a possible power production level of the plurality of power generators, such as a collective or aggregate possible power production of all of the power generators combined. Further, as an example, the demand signal may be less than the possible power due to market conditions, e.g., decreased economic demand for electrical power from the electrical grid. As another example, the demand signal may be less than the possible power due to excess capacity of the power generators, such as during extended sunny daylight hours in embodiments where one or more of the power generators include photovoltaic cells, and/or such as during sustained high wind conditions in embodiments where one or more of the power generators include a wind turbine or wind turbines.

Still referring to FIG. 5, the method 500 further includes generating power production command(s) for one or more of the power generators in the electrical system. For example, as shown at (520), the method 500 may include generating a first power production command for a first power generator of the plurality of power generators. The first power production command for the first power generator may be generated, e.g., with the system-level controller. Further, as shown at (522), the method 500 may generating a second power production command for a second power generator of the plurality of power generators, e.g., with the system-level controller. One or more of the power production commands may include or consider an excluded zone of operations for the respective power generator or generators. For example, in some embodiments, the power production command for the first power generator may be based on an excluded zone of operation for the first power generator.

Still referring to FIG. 5, as shown at (530), the method 500 may also include transmitting the first power production command and the second power production command to the plurality of power generators so as to control a power output of the first power generator according to the first power production command and so as to control a power output of the second power generator according to the second power production command. As a result, e.g., when each power generator operates according to the respective transmitted power production command, the power output of the first power generator may be outside of the excluded zone of operation for the first power generator. Moreover, the aggregate power output of the plurality of power generators, e.g., of at least the first power generator and the second power generator, may meet the demand of the electrical grid, e.g., may meet the demand indicated by or corresponding to the demand signal received from the electrical grid. For example, the power production commands may be generated by the system-level controller in response to the demand signal and may be generated in order to cause the plurality of power generators to provide the demanded power to the electrical grid, while also not operating any of the power generators within one or more respective excluded zones of operation.

In some embodiments, the excluded zone of operation for the first power generator may include a minimum excluded power output and a maximum excluded power output. In such embodiments, the power output of the first power generator according to the first power production command may be less than the minimum excluded power output or may be greater than the maximum excluded power output. Thus, for example, the power output of the first power generator may be outside of the excluded zone of operation for the first power generator in that the power output is below the excluded zone or above the excluded zone. In some embodiments, the endpoints of the excluded zone, e.g., the minimum excluded power output and the maximum excluded power output, may be defined as a percentage of the full rated capacity of the power generator. In some embodiments, the endpoints of the excluded zone, e.g., the minimum excluded power output and the maximum excluded power output, may be defined as or may include active power setpoints, e.g., as measured in kilowatts (kW), or may be defined as or may include reactive power setpoints, e.g., as measured in kilovolt-amperes reactive (kVAR). Additionally, it should be understood that the excluded zone is inclusive, e.g., of both endpoints (both the maximum excluded power output and the minimum excluded power output) and of all intermediate values therebetween.

For example, the excluded zone of operation may extend, inclusively, from a minimum excluded power output of zero, e.g., zero percent capacity, zero kW, zero kVAR, etc., to the maximum excluded power output, e.g., five percent capacity, such as 100 kW for a power generator that has a rated power output of two megawatts (2 MW or 2,000 kW). As another example, the excluded zone of operation may also or instead extend from about twenty percent rated capacity to about twenty-five percent rated capacity, among numerous other possible examples, including ranges narrower or wider than about five percentage points of the rated capacity of the respective power generator(s). For example, when the minimum excluded power output is at or about twenty percent of the rated capacity (20%), the power generator may operate freely within a range up to the minimum excluded power output, e.g., 20%, then hold at twenty percent of the rated capacity until the aggregate demand is high enough to operate the power generator above the excluded zone, e.g., above the maximum excluded power output, e.g., above twenty-five percent capacity.

In various embodiments, as will be described further below, one or more power generators of the plurality of power generators may have one or more excluded zones of operation. Thus, for example, a single power generator may have multiple excluded zones and/or multiple power generators may each have at least one excluded zone, in various combinations. Also by way of example, when multiple power generators each have at least one excluded zones, the excluded zones may be the same across multiple power generators, may vary from one power generator to another, or combinations thereof, e.g., one power generator may have multiple excluded zones, of which one excluded zone is the same as the excluded zone of operation for another power generator while another excluded zone of the power generator is different from that of the other power generator, such as the other power generator may only have one excluded zone of operation, etc.

In some embodiments, the excluded zone of operation (or one of the excluded zones, e.g., in embodiments where a single power generator has multiple excluded zones) may be a design minimum operation level for the corresponding power generator. Thus, for example, the minimum excluded power output may be zero. In such embodiments, the power output of the first power generator according to the first power production command may be greater than the maximum excluded power output, e.g., above the design minimum operation level.

In some embodiments, the excluded zone or zones of operation may be tied to or based on characteristics of the power generator. For example, in embodiments where one or more of the power generators in the plurality of power generators is a wind turbine, the excluded zone or zones may be based on excluded rotor speeds for the wind turbine. For example, the wind turbine(s) may be subject to a design minimum operation level, as described above, whereby the rotor speed remains above zero. Such embodiments may advantageously promote efficiency and responsiveness of the system by keeping as many of the power generators, e.g., wind turbines, online as possible, because it may take longer for an offline power generator to ramp up generator speed and come online as compared to the time required for an online curtailed power generator to raise an active power level (e.g., greater than zero) to the demanded post-curtailment level. For example, such as where the offline power generator is a wind turbine with rotors at zero speed, the time required to ramp up and come online may be longer due to the inertia of numerous or massive moving parts of the wind turbine or other power generator, e.g., the rotors of the wind turbine, when starting from zero speed.

As mentioned, more than one of the power generators of the plurality of power generators may be subject to an excluded zone (or, in some embodiments, more than one excluded zones) of operation. For example, in some embodiments, the second power production command for the second power generator of the plurality of power generators may be generated based on an excluded zone of operation for the second power generator. In such embodiments, the power output of the second power generator may be outside of the excluded zone of operation for the second power generator, e.g., according to the power production command for the second power generator which was generated by the system-level controller based on the excluded zone of operation for the second power generator and in response to the demand signal from the electrical grid. In various embodiments, the excluded zones of operation may be the same or may differ, for example, the excluded zone of operation for the second power generator may be equal to the excluded zone of operation for the first power generator, or may differ (entirely or with some overlapping ranges within the multiple excluded zones of the multiple power generators) from the excluded zone of operation for the first power generator.

In some embodiments, the excluded zone of operation may be applied when the electrical system is in curtailment, e.g., when the demand signal from the electrical grid is less than an aggregate possible power production of the plurality of power generators. In particular, such embodiments may be useful in combination with embodiments where the excluded zone, or one of the excluded zones, includes a zero endpoint (e.g., a minimum excluded power output is zero), such that the power generator (or each power generator that is subject to the excluded zone of operation) is commanded by the system-level controller to operate at or above the design minimum operating level, which may advantageously provide increased efficiency and faster response time as compared to completely shutting down the power generator(s) during curtailment.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling an electrical system connected to an electrical grid, the electrical system having a plurality of power generators, the method comprising: receiving, with a system-level controller of the electrical system, a demand signal from the electrical grid; generating, with the system-level controller, a first power production command for a first power generator of the plurality of power generators based on an excluded zone of operation for the first power generator; generating, with the system-level controller, a second power production command for a second power generator of the plurality of power generators; and transmitting the first power production command and the second power production command to the first and second power generators, respectively, so as to control a power output of the first power generator according to the first power production command and to control a power output of the second power generator according to the second power production command, wherein the power output of the first power generator is outside of the excluded zone of operation for the first power generator.

Clause 2. The method of any preceding clause, wherein the excluded zone of operation for the first power generator defines a minimum excluded power output and a maximum excluded power output, wherein the first power production command is less than the minimum excluded power output or is greater than the maximum excluded power output.

Clause 3. The method of any preceding clause, wherein the minimum excluded power output is zero, wherein the first power production command is greater than the maximum excluded power output.

Clause 4. The method of any preceding clause, wherein the second power production command is generated based on an excluded zone of operation for the second power generator, and wherein the power output of the second power generator is outside of the excluded zone of operation for the second power generator.

Clause 5. The method of any preceding clause, wherein the excluded zone of operation for the second power generator is equal to the excluded zone of operation for the first power generator.

Clause 6. The method of any preceding clause, wherein the demand signal from the electrical grid is less than an aggregate possible power production of the plurality of power generators.

Clause 7. The method of any preceding clause, wherein at least one power generator of the plurality of power generators is a wind turbine.

Clause 8. The method of any preceding clause, wherein the electrical system is a hybrid system comprising the wind turbine and at least one other type of power generator other than a wind turbine.

Clause 9. The method of any preceding clause, wherein the electrical system is a wind farm.

Clause 10. A system for providing electrical power to an electrical grid, the system comprising: a plurality of power generators operatively coupled to the electrical grid; and a system-level controller communicatively coupled to the plurality of power generators and to the electrical grid, the system-level controller comprising at least one processor configured to perform a plurality of operations, the plurality of operations comprising: receiving, with the system-level controller, a demand signal from the electrical grid; generating, with the system-level controller, a first power production command for a first power generator of the plurality of power generators based on an excluded zone of operation for the first power generator; generating, with the system-level controller, a second power production command for a second power generator of the plurality of power generators; and transmitting the first power production command and the second power production command to the first and second power generators, respectively, so as to control a power output of the first power generator according to the first power production command and to control a power output of the second power generator according to the second power production command, wherein the power output of the first power generator is outside of the excluded zone of operation for the first power generator.

Clause 11. The system of any preceding clause, wherein the excluded zone of operation for the first power generator includes a minimum excluded power output and a maximum excluded power output, wherein the first power production command is less than the minimum excluded power output or is greater than the maximum excluded power output.

Clause 12. The system of any preceding clause, wherein the minimum excluded power output is zero, wherein the first power production command is greater than the maximum excluded power output.

Clause 13. The system of any preceding clause, wherein the second power production command is generated based on an excluded zone of operation for the second power generator, and wherein the power output of the second power generator is outside of the excluded zone of operation for the second power generator.

Clause 14. The system of any preceding clause, wherein the excluded zone of operation for the second power generator is equal to the excluded zone of operation for the first power generator.

Clause 15. The system of any preceding clause, wherein the demand signal from the electrical grid is less than an aggregate possible power production of the plurality of power generators.

Clause 16. The system of any preceding clause, wherein at least one power generator of the plurality of power generators is a wind turbine.

Clause 17. The system of any preceding clause, wherein the system is a hybrid system comprising the wind turbine and at least one other type of power generator other than a wind turbine.

Clause 18. The system of any preceding clause, wherein the system is a wind farm comprising the wind turbine and at least one other wind turbine.

What is claimed is:

1. A method for controlling an electrical system connected to an electrical grid, the electrical system comprising a plurality of power generators, the method comprising:
receiving, with a system-level controller of the electrical system, a demand signal from the electrical grid;
generating, with the system-level controller, a first power production command for a first power generator of the plurality of power generators based on an excluded zone of operation for the first power generator;
generating, with the system-level controller, a second power production command for a second power generator of the plurality of power generators; and
transmitting the first power production command and the second power production command to the first and second power generators, respectively, so as to control a power output of the first power generator according to the first power production command and to control a power output of the second power generator according to the second power production command, wherein the power output of the first power generator is outside of the excluded zone of operation for the first power generator,
wherein the excluded zone of operation for the first power generator defines a minimum excluded power output and a maximum excluded power output, wherein the first power production command is less than the minimum excluded power output or is greater than the maximum excluded power output,
wherein the second power production command is generated based on an excluded zone of operation for the second power generator, and wherein the power output of the second power generator is outside of the excluded zone of operation for the second power generator,
wherein the first power generator and the second power generator are distinct types of power generators.

2. The method of claim 1, wherein the minimum excluded power output is zero, wherein the first power production command is greater than the maximum excluded power output.

3. The method of claim 1, wherein the excluded zone of operation for the second power generator is equal to the excluded zone of operation for the first power generator.

4. The method of claim 1, wherein the demand signal from the electrical grid is less than an aggregate possible power production of the plurality of power generators.

5. The method of claim 1, wherein at least one power generator of the plurality of power generators is a wind turbine.

6. The method of claim 5, wherein the electrical system is a hybrid system comprising the wind turbine and at least one other type of power generator other than a wind turbine.

7. The method of claim 5, wherein the electrical system is a wind farm.

8. The method of claim 1, wherein the excluded zone of operation for the second power generator defines a minimum excluded power output and a maximum excluded power output, wherein the second power production command is less than the minimum excluded power output or is greater than the maximum excluded power output.

9. A system for providing electrical power to an electrical grid, the system comprising:
a plurality of power generators operatively coupled to the electrical grid; and
a system-level controller communicatively coupled to the plurality of power generators and to the electrical grid, the system-level controller comprising at least one processor configured to perform a plurality of operations, the plurality of operations comprising:
receiving, with the system-level controller, a demand signal from the electrical grid;
generating, with the system-level controller, a first power production command for a first power generator of the plurality of power generators based on an excluded zone of operation for the first power generator;
generating, with the system-level controller, a second power production command for a second power generator of the plurality of power generators; and
transmitting the first power production command and the second power production command to the first and second power generators, respectively, so as to control a power output of the first power generator according to the first power production command and to control a power output of the second power generator according to the second power production command, wherein the power output of the first power generator is outside of the excluded zone of operation for the first power generator, wherein the excluded zone of operation for the first power generator defines a minimum excluded power output and a maximum excluded power output, wherein the first power production command is less than the minimum excluded power output or is greater than the maximum excluded power output, wherein the second power production command is generated based on an excluded zone of operation for the second power generator, and wherein the power output of the second power generator is outside of the excluded zone of operation for the second power generator, wherein the first power generator and the second power generator are distinct types of power generators.

10. The system of claim 9, wherein the minimum excluded power output is zero, wherein the first power production command is greater than the maximum excluded power output.

11. The system of claim 9, wherein the excluded zone of operation for the second power generator is equal to the excluded zone of operation for the first power generator.

12. The system of claim 9, wherein the demand signal from the electrical grid is less than an aggregate possible power production of the plurality of power generators.

13. The system of claim 9, wherein at least one power generator of the plurality of power generators is a wind turbine.

14. The system of claim 13, wherein the system is a hybrid system comprising the wind turbine and at least one other type of power generator other than a wind turbine.

15. The system of claim 13, wherein the system is a wind farm comprising the wind turbine and at least one other wind turbine.

16. The system of claim 9, wherein the excluded zone of operation for the second power generator defines a minimum excluded power output and a maximum excluded power output, wherein the second power production command is less than the minimum excluded power output or is greater than the maximum excluded power output.

* * * * *